US008931396B2

(12) United States Patent
Dugas

(10) Patent No.: US 8,931,396 B2
(45) Date of Patent: Jan. 13, 2015

(54) METHOD FOR THE REMOVAL OF SEDIMENT FROM SPARKLING WINES

(75) Inventor: Freddy Dugas, Epernay (FR)

(73) Assignee: MHCS, Epernay (FR)

( * ) Notice: Subject to any disclaimer, the term of this patent is extended or adjusted under 35 U.S.C. 154(b) by 547 days.

(21) Appl. No.: 12/989,983

(22) PCT Filed: Apr. 29, 2009

(86) PCT No.: PCT/FR2009/050796
§ 371 (c)(1),
(2), (4) Date: Oct. 28, 2010

(87) PCT Pub. No.: WO2009/138699
PCT Pub. Date: Nov. 19, 2009

(65) Prior Publication Data
US 2011/0064857 A1  Mar. 17, 2011

(30) Foreign Application Priority Data

Apr. 30, 2008 (FR) ...................................... 08 52947

(51) Int. Cl.
*B67B 7/04* (2006.01)
*B67B 7/00* (2006.01)
*C12G 1/08* (2006.01)

(52) U.S. Cl.
CPC ........................................ *C12G 1/08* (2013.01)
USPC ................. 99/275; 81/3.2; 414/411; 414/425

(58) Field of Classification Search
USPC .............. 99/275, 277.1, 277.2; 414/415, 411, 414/425; 81/3.2
See application file for complete search history.

(56) References Cited

U.S. PATENT DOCUMENTS 1,740,186 A * 12/1929 Lippold .......................... 134/62
2,106,192 A    1/1938 Saville
(Continued)

FOREIGN PATENT DOCUMENTS

ES    2 147 194    9/2000
FR      379 124   10/1907
(Continued)

OTHER PUBLICATIONS

International Search Report dated Oct. 20, 2009 for Application No. PCT/FR2009/050796.
(Continued)

*Primary Examiner* — Reginald L Alexander
(74) *Attorney, Agent, or Firm* — Frost Brown Todd LLC

(57) ABSTRACT

Apparatus for the removal of sediment from sparkling wines, designed to remove the capsule covering the neck of a bottle (18) containing sparkling wine, comprising: a frame (12), a tilting mechanism (14) comprising: a holder (16) for supporting a bottle (18) in a predetermined position, said holder (16) being movable on the frame (12) between a low position, in which the neck is inclined downwards, and a high position in which the neck is inclined upwards, and a capsule removing mechanism (32) provided with at least one capsule removing knife, said capsule removing mechanism (32) being movable on the holder (16) and synchronized with said holder (16) so that the said capsule removing knife or knives remove(s) the capsule, when the holder (16) is in a predetermined angular position relative to the horizontal. The capsule removing knife is movable relative to the capsule removing mechanism (32).

20 Claims, 6 Drawing Sheets

(56) References Cited

U.S. PATENT DOCUMENTS

Figure 1:
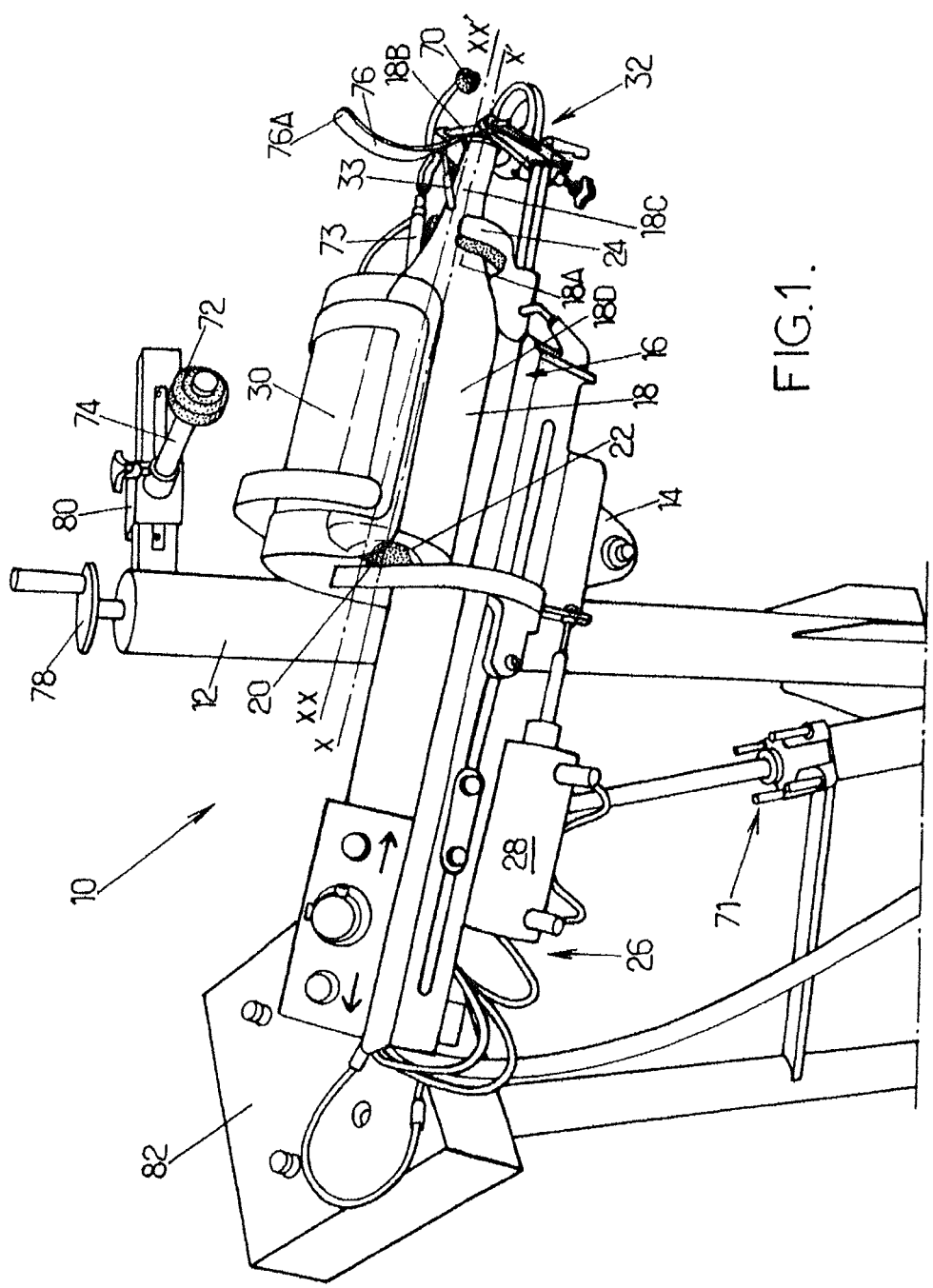

| | | | |
|---|---|---|---|
| 2,672,267 A | * | 3/1954 | Menning et al. ............ 141/174 |
| 3,651,751 A | | 3/1972 | Randrup |
| 2007/0213513 A1 | | 9/2007 | Van Alstine et al. |

FOREIGN PATENT DOCUMENTS

| | | |
|---|---|---|
| FR | 1 211 569 | 3/1960 |
| FR | 1 506 569 | 12/1967 |
| FR | 2 060 991 | 6/1971 |
| FR | 2 691 160 | 11/1993 |
| WO | WO 2005/094960 | 10/2005 |

OTHER PUBLICATIONS

Written Opinion dated Dec. 18, 2010 for Application No. PCT/FR2009/050796.

* cited by examiner

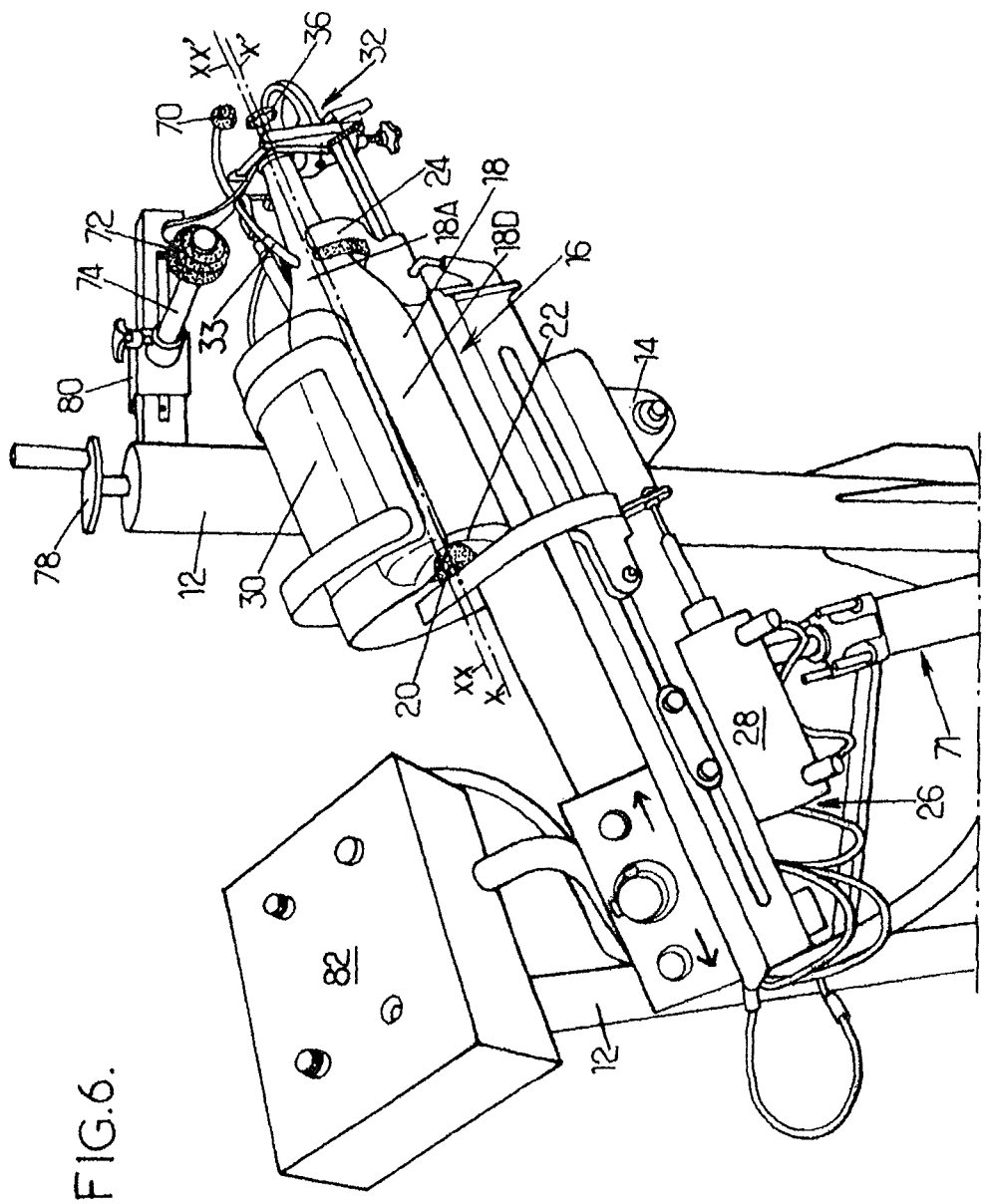

METHOD FOR THE REMOVAL OF SEDIMENT FROM SPARKLING WINES

The present invention relates to a method for the removal of sediment from sparkling wines (disgorging) produced by the traditional method, which is designed to remove the capsule covering the neck of a bottle containing sparkling wine and an apparatus for the removal of sediment from sparkling wines, comprising:

a frame, a tilting mechanism comprising:

a holder for supporting a bottle in a predetermined position in which said bottle extends longitudinally along a longitudinal axis close to a median axis which is fixed with respect to said holder, said holder being movable on the frame between a low position, in which the neck of the bottle is inclined downward, and a high position, in which the neck of the bottle is inclined upward, and a capsule-removing mechanism provided with at least one capsule-removing knife, said capsule-removing mechanism being movable on the holder and synchronized with said holder so that the capsule-removing knife removes the capsule when the holder is in a predetermined angular position relative to the horizontal.

Such apparatus for disgorging sparkling wines make it possible to automatically disgorge bottles containing sparkling wine, in particular champagne.

In a manner known per se, before being placed on the market, bottles of sparkling wine undergo a disgorging operation designed to allow removal of sediment, generated by the degradation of yeasts, which is formed during fermentation of the wine and which is deposited in the bottle neck over time. This disgorging operation, which is generally carried out just prior to dispatch of the product, consists in removing the capsule closing the bottle and allowing the sediment to be ejected through the effect of the pressure in the bottle. The bottle is then restopped with a traditional cork stopper held in place by a wire cage with a view to the wine being marketed or undergoing a final aging. The disgorging operation is successful when two objectives are achieved: first, complete expulsion of the sediment, which contains the residues from fermentation; and, second, a limited loss in terms of wine, essentially in the form of foam. This operation is thus very delicate. When this operation is performed manually, it requires great dexterity acquired by the operator through experience.

Automatic apparatus for disgorging sparkling wines that comprise a tilting holder carrying a pivoting element provided with a capsule-removing knife are known. Said knife, positioned behind the folded border of the capsule, makes it possible, when pivoted, to separate the capsule from the neck. This disgorging operation has to be carried out extremely carefully. Indeed, if the disgorging operation is to be performed successfully, opening of the bottle, which releases the pressurized gas contained therein, must be carried out in a step of tilting the bottle at a precise inclination of the bottle neck.

A disgorging apparatus that includes such a tilting holder is described, in particular, in document WO2004/096970.

However, known apparatus for the removal of sediment are generally adapted for a given bottle type, in particular for conventional bottles with a 75-cl capacity. Yet, bottles may be of different capacities, ranging, in particular, from the split (18.75 cl or 20 cl) to much greater capacities, such as the magnum (1.5 l), the jeroboam (3l), or larger. In point of fact, known apparatus for the removal of sediment are not adapted to large capacities over and above the jeroboam. In practice, disgorging bottles of large capacities is carried out manually, which is particularly difficult and even dangerous for the operator, given the weight of the bottle and the force with which the sediment is expelled from the bottle. Furthermore, the very geometry of the bottle, in particular the diameter and the length of its neck, and the positioning of the ring located on the neck relative to the lip (free end part of the neck), etc., may vary for a given capacity from one bottle to another and/or from one bottle manufacturer to another. It may thus also prove to be very useful to be able to have a disgorging apparatus available that adapts easily to all these variations, including the large capacities over and above the jeroboam.

Furthermore, the drawback of such known disgorging apparatus is that the bottle has to be placed very precisely by the operator so that the capsule-removing knife can be correctly positioned. Understandably, when the capsule-removing knife is not positioned correctly relative to the capsule, the disgorging operation may not be achieved satisfactorily and/or may give rise to the fracture of the lip by the capsule-removing knife. In this latter case, the bottle is unusable and the wine generally wasted. This is also the case when the sediment has not been completely expelled. The bottle and the wine it contains are then removed from the production line. Indeed, it is observed that, when the positioning of the capsule-removing knife is fixed relative to the median axis of the holder, when the bottle axis does not correspond to the median axis the capsule-removing knife may well be poorly positioned, which may give rise to the aforesaid drawbacks.

The object of the invention is to allow semi-automatic disgorging reliably and reproducibly for various sparkling-wine bottle geometries.

To that end, a first object of the invention is to provide a disgorging apparatus that can be adapted to all types of sparkling-wine bottles and, most particularly, to bottles of large capacity. Such a disgorging apparatus according to the invention makes it possible to adapt easily to market requirements in terms of large-capacity bottles and, by virtue of its very simple method of use, allows a non-specialist operator to successfully perform the disgorging operation without excessive effort and without operator risk in the handling steps.

According to the invention, said capsule-removing knife of the disgorging apparatus is movable relative to the capsule-removing mechanism in order to approach and to move away from the median axis, said capsule-removing knife being urged toward said median axis.

Thus, the apparatus allows a degree of variation in the positioning of the bottle axis, since the knife is movable relative to the median axis and its position adapts to that of the bottle neck.

In various embodiments of the disgorging apparatus according to the invention, recourse may, furthermore, possibly be had to one and/or another of the following arrangements:

the capsule-removing knife slides under its own weight in the capsule-removing mechanism, the capsule-removing knife has a free end edge that is inclined relative to the horizontal and that is beveled, the capsule-removing device comprises two capsule-removing knives, the inclination of the free end edge of one of the two capsule-removing knives opposes the inclination of the free end edge of the other of the two capsule-removing knives, the holder slides relative to the tilting mechanism along the axis XX', the disgorging apparatus comprises, furthermore, a roller mounted rotatably about a shaft fixed to the frame in an adjustable manner, and the tilting mechanism further comprises a cam portion designed to come into contact with said roller in order to pivot the capsule-removing mechanism and thus remove the capsule, the capsule-removing mechanism includes a movable part and compensation members allowing optimization of the position of the capsule-removing knife relative to the neck, the disgorging apparatus comprises, furthermore, members for adjusting the shaft of the roller that make it possible to adjust the synchronicity of the capsule-removing mechanism, the disgorging apparatus comprises, furthermore, adjustment members that allow the adjustment of the capsule-removing mechanism relative to the holder, in terms of height, in terms of inclination and/or in terms of spacing, the disgorging apparatus comprises, furthermore, a stopper-forming member designed to provisionally close the neck of the bottle after removal of the capsule, said stopper-forming member being movable between an open position, in which it is distanced from the bottle, and a closed position, in which it closes the neck of the bottle.

A second object of the invention is to provide a method that makes it possible reliably and reproducibly to disgorge all types of sparkling-wine bottles.

According to the invention, the method comprises the following steps:

positioning the bottle on the holder of an apparatus for the removal of sediment when said holder is in the low position, automatic positioning of the capsule-removing knife relative to the bottle, automatic tilting of the bottle toward the high position and automatic removal of the capsule from the bottle during said tilting, with simultaneous ejection of the sediment contained in the neck of the bottle.

Thus the method allows a certain degree of variation in the positioning of the bottle axis relative to the median axis since the knife is movable relative to the latter and its position adapts automatically to that of the bottle neck.

In various embodiments of the disgorging method according to the invention, recourse may furthermore possibly be had to one and/or another of the following arrangements:

the automatic positioning of the knife is achieved by means of raising then automatic release of the knife between the free edge of the indentations of the capsule and the ring of the bottle during positioning of the bottle, after removal of the capsule, the bottle is automatically closed, the holder slides toward the capsule-removing knife prior to the automatic tilting of the bottle toward the high position.

The invention will be properly understood and the advantages thereof will become more clearly apparent upon reading the following detailed description of one of the embodiments thereof, which is given by way of non-limiting example.

Figure 2:
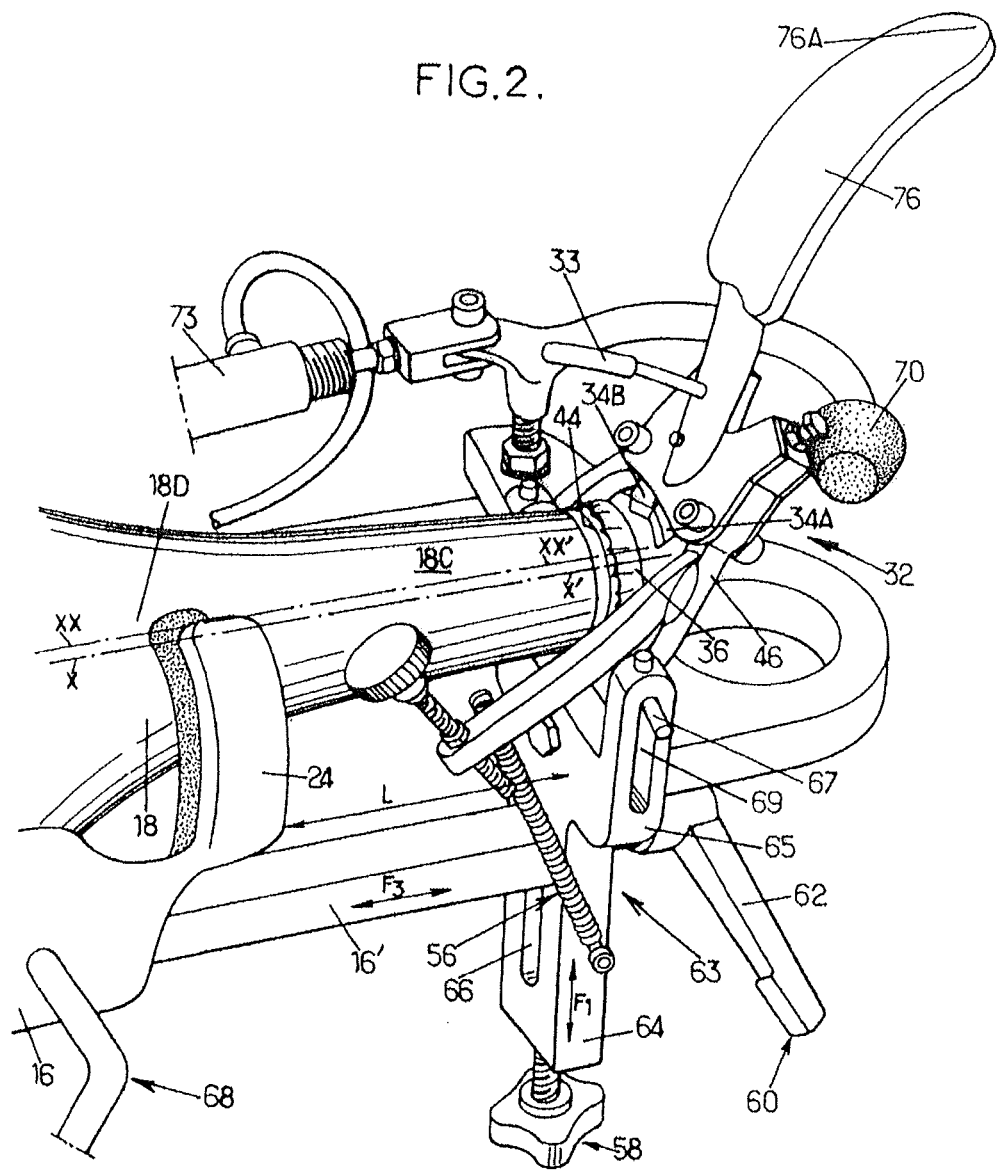
Figure 3:
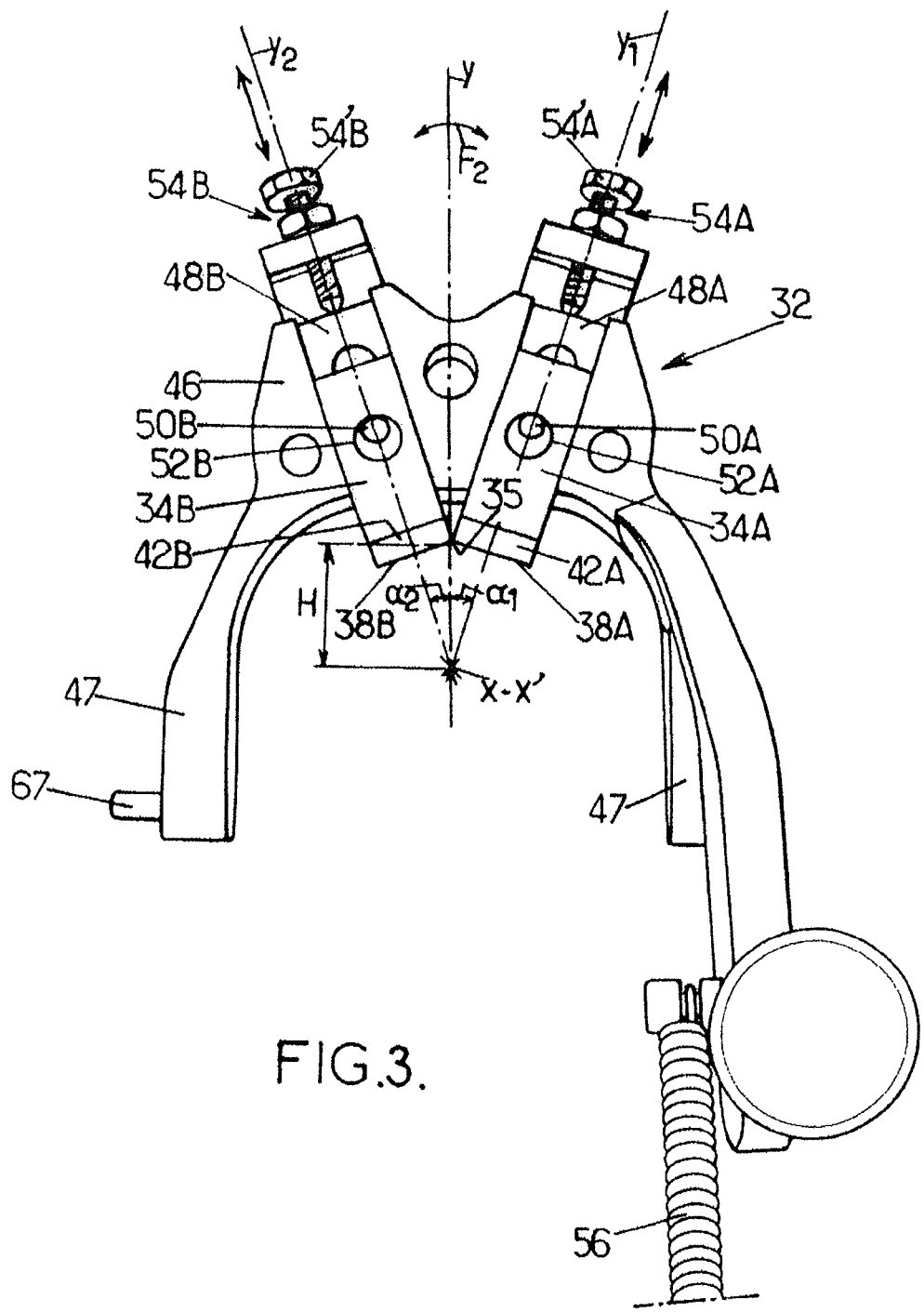
Figure 4:
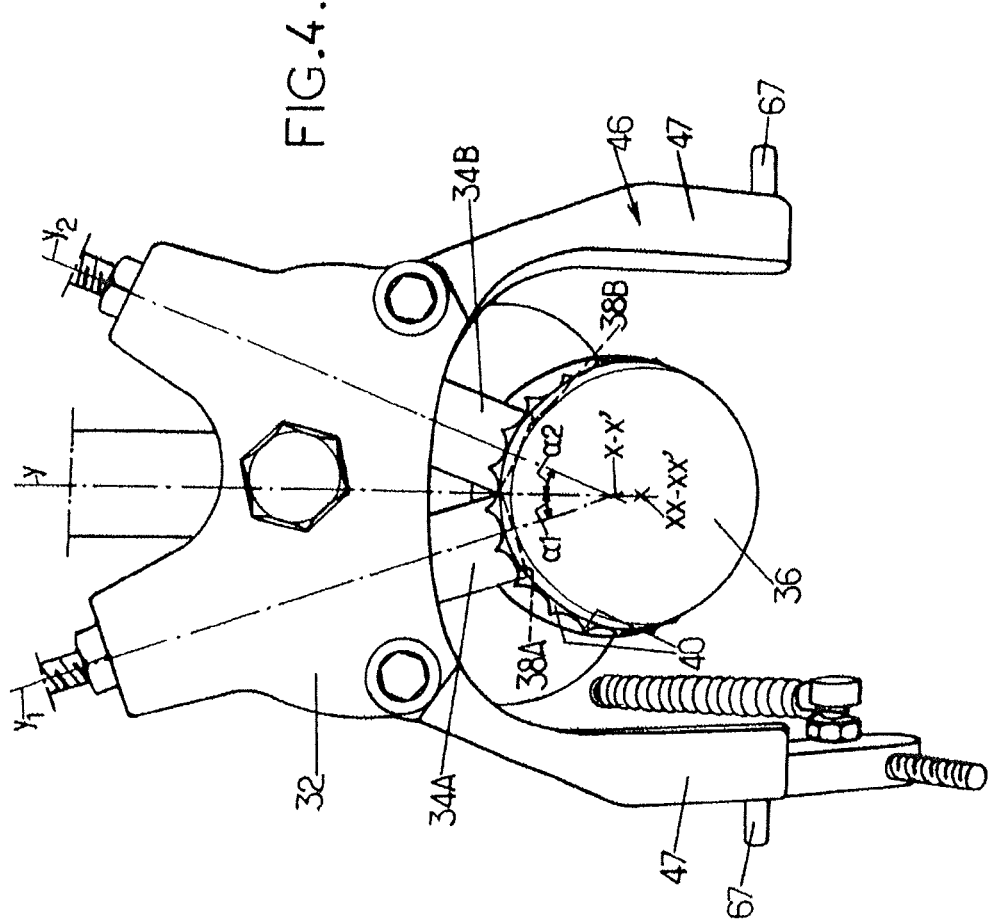
Figure 5:
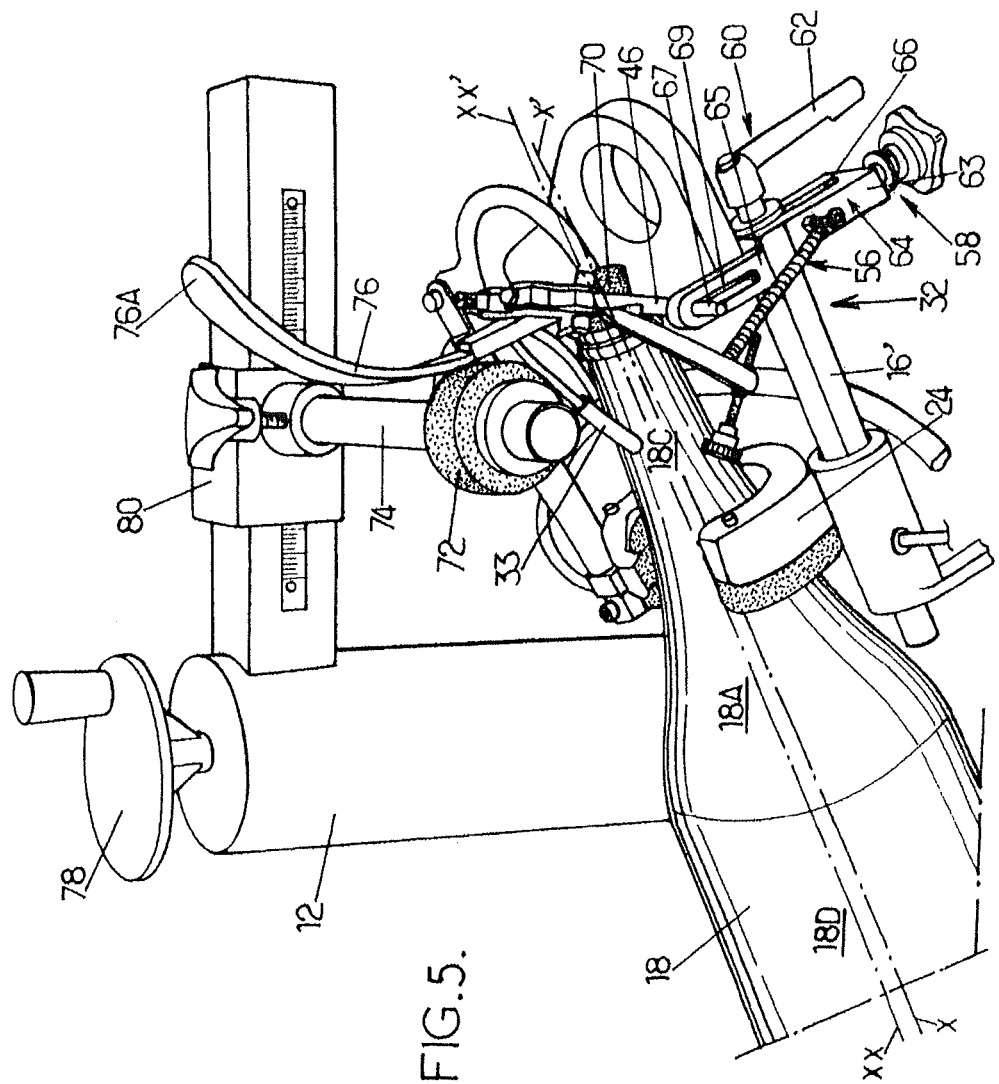

The description makes reference to the appended drawings, in which:

FIG. 1 represents a perspective view of the apparatus for the removal of sediment according to the invention, in the low position, FIG. 2 represents a perspective view of the part of the apparatus for the removal of sediment of FIG. 1, illustrating the capsule-removing mechanism in detail, FIG. 3 represents a side view of a part of the capsule-removing mechanism, FIG. 4 represents an opposite side view of the part of the capsule-removing mechanism of FIG. 3, FIG. 5 represents a partial perspective view of the apparatus for the removal of sediment according to the invention, in the high position, and FIG. 6 represents a perspective view of the disgorging apparatus according to the invention, in an intermediate position.

FIG. 1 illustrates an apparatus for the removal of sediment from sparkling wine 10 comprising a frame 12 and a tilting mechanism 14. The tilting mechanism 14 includes a holder 16 adapted for supporting a sparkling-wine bottle 18.

Bottles, in particular bottles for sparkling wines, generally have a flared part that is commonly known as the shoulder 18A, which connects the bottle body 18D to the neck 18C, The neck 18C extends from the shoulder 18A as far as an end part via which the wine is poured and which is commonly called the lip 18B. A ring 44 forming an external bulge extends in a circular manner around the neck 18C in the vicinity of the lip 18B. Furthermore, bottles designed to contain sparkling wines, in particular champagne wines, have a much-hollowed-out base 22 in order to withstand the gas pressure created, which may be as much as six atmospheres.

The holder 16 includes a domed part forming a stop 20 and a semi-circular ring 24 and defines a fixed median axis X-X'. The bottle 18 is held on the holder 16 first by the domed part forming the stop 20, which substantially matches the punt 22 formed in the base of the bottle 18, and, second, by the semi-circular ring 24 on which the shoulder 18A of the bottle 18 rests. The domed piece forming the stop 20 may be moved away from or closer to the semi-circular ring 24 so as to immobilize the bottle 18 on the holder 16. To that end, provision may be made for displacement means that make it possible to slide the holder 16 and, in the case in point, the domed part forming the stop 20 relative to the frame 16 along the axis X-X'. By way of example, these displacement means which may be controlled by pneumatic means 26 of known type, comprise in particular a ram 28 connected to the domed part forming the stop 20. It is also possible to make provision for domed parts of different sizes adapted to each bottle capacity.

A pivoting casing 30 mounted in an articulated manner on the holder 16 makes it possible at least partially to cover the body 18D of the bottle 18 in order to protect the operator.

Before the bottle 18 is placed on the disgorging apparatus 10, the tilting mechanism 14 is tilted into its low position, as illustrated in FIG. 1. In this low position, the bottle 18 can be placed on the holder 16 with its neck 18B inclined downward (being located below the horizontal relative to the base of the bottle). Thus, in this low position, the sediment formed in the bottle 18 remains deposited in the neck 18C of the bottle in particular in the shoulder 18A.

After it has been placed on the holder 16, and after sliding of the domed part forming the stop 20, the bottle 18, which extends longitudinally along a longitudinal axis XX-XX' close to the median axis X-X', is securely held and the disgorging operation can start. At this stage, the bottle 18 is closed by a capsule 36 that generally has a folded border with indentations 40 that cover the lip 18B and a portion of the outside of the neck 18C as far as the vicinity of the semi-circular ring 24.

The tilting mechanism 14 includes, furthermore, a capsule-removing mechanism 32 provided with at least one capsule-removing knife, in this case two capsule-removing knives 34A and 34B. The capsule-removing mechanism 32 is movable on the holder 16, being synchronized therewith, so that the capsule-removing knives 34A and 34B remove the capsule 36 when the holder 16 is in a predetermined angular position relative to the horizontal, as illustrated in FIG. 2.

With reference to FIG. 3, each of the capsule-removing knives 34A, 34B has a free end edge, 38A and 38B, respectively, designed to be inserted at the rear of the capsule 36, between the free edge of the capsule and the lip 18B. The free end edge 38A and 38B is preferably inclined relative to the horizontal so that it can be suitable for interacting with at least one of the indentations 40 of the capsule 36, as illustrated in detail in FIG. 4.

The disgorging apparatus 10 illustrated in FIGS. 3 and 4 preferably includes two capsule-removing knives, but, understandably, it could potentially include a single capsule-removing knife arranged vertically, for example.

In the embodiment illustrated in the figures, the free end edges 38A and 38B of the capsule-removing knives 34A and 34B are inclined in opposite directions, as explained in greater detail below, so as to guarantee that one at least of the knives is able to interact with one at least of the indentations 40 on the free edge of the capsule 36. The capsule-removing knife 34A or 34B preferably has an end portion 42A or 42B, respectively, that is beveled. The free end portion 42A or 42B thus beveled enables each of the capsule-removing knives 34A or 34B, respectively, to be properly inserted between the ring 44 of the bottle 18 and the free edge of the indentations 40 of the capsule 36.

Returning to FIG. 3, each of the capsule-removing knives 34A and 34B is able to slide under its own weight in the capsule-removing mechanism 32, which enables each one of them to be free in translation and thus to be able to move closer to and further away from the median axis X-X'. The knives 34A and 34B are movable and are thus naturally urged toward the median axis X-X' through the effect of their own weight.

In fact, the capsule-removing mechanism includes a stirrup-shaped piece 46 on which the capsule-removing knives 34A and 34B are secured, which stirrup-shaped piece 46 is provided with two grooves 48A and 48B, each preferably inclined relative to the vertical. The groove 48A extends longitudinally along an axis Y1 that is inclined relative to the vertical axis Y at an angle α1. The situation is the same for the second groove 48B, which extends longitudinally along an axis Y2 that is inclined by an angle α2 relative to the vertical axis Y. Thus, the groove 48A is symmetrically opposed to the groove 48B relative to a plane that would pass via the median axis X-X' and the vertical axis Y. In particular, when the stirrup-shaped piece 46 is centered relative to the median axis X-X', these two angles, α1 and α2, are equal.

Thus, the free end edge 38A, 38B of each of the capsule-removing knives 34A and 34B is inclined relative to the horizontal by an angle α1 or α2, respectively.

Each groove 48A or 48B is adapted so as to be able to accommodate a capsule-removing knife 34A or 34B, respectively in a sliding manner. In the absence of a bottle, the capsule-removing knives 34A and 34B slide until their free end edges 38A and 38B come into contact with one another at a contact point 35 (see FIG. 3).

However, in order to retain the capsule-removing knives 34A and 34B in these grooves 48A and 48B, and to prevent said knives falling out of the capsule-removing mechanism 32, the grooves 48A and 48B are each provided with a stud 50A or 50B, respectively, which interacts with an aperture 52A or 52B respectively, formed in the knife 34A or 34B respectively. The apertures 52A and 52B are preferably chosen so that they are larger than the studs 50A and 50B, such that each of the knives 34A and 34B can move about each of the studs 50A, 50B, along axis Y1 or Y2 respectively.

Adjustment members 54A or 54B that include, in particular, a pressure screw system 54'A and 54'B allow adjustment of the position of the studs 50A and 50B relative to the median axis X-X' so that it is possible to move the studs 50A and 50B further away from or closer to the median axis X-X'.

Return means 56 enable the capsule-removing mechanism 32 to be held in a position in which the knives 34A and 34B are located between the ring 44 and the free edge of the indentations 40 of the capsule 36.

This stirrup-shaped piece 46 constitutes a movable part of the capsule-removing mechanism 32, which allows optimization of the extreme position of the knives 34A and 34B relative to the bottle neck by virtue of compensation members provided on the capsule-removing mechanism 32. These compensation members make it possible to compensate for the dimensional differences that may arise from one bottle to another, and thus to prevent damage to the lip of the bottle.

To that end, the capsule-removing mechanism 32 further includes a fork 63 that allows the stirrup-shaped piece 46 carrying the knives 34A and 34B a degree of movement relative to the bottle. The fork 63 is formed by a free-end central portion 64 and by two arms 65, each provided with a stud 67. Each of the studs 67 is, respectively, engaged in one of the respective longitudinal apertures 69 provided for that purpose in the arms 65 of the fork 63, such that the stirrup-shaped piece 46 is able to slide relative to the fork 63 and thus to allow the arms to move closer together or farther apart.

A length-adjustable stop 33 is, moreover, connected to the capsule-removing mechanism 32 so as to be able to bear on the bottle neck and to limit the possible travel of the stirrup-shaped piece 46 relative to the fork 63.

As described in greater detail below, these compensation members enable the operator to adjust the extreme position of the knives and thus to optimize disgorging of the bottles. Indeed, understandably, as soon as the knives are too far away from the neck, they will not be able to act correctly on the capsule. Furthermore, the apertures 69 allow a degree of movement of the stirrup-shaped piece during this disgorging operation, thus making it possible to reduce the force of the knives on the lip of the bottle and thereby preventing breakage of the lip, which may occur if the force is too great.

With reference to FIGS. 2 and 3, the capsule-removing mechanism 32 is secured adjustably on a longitudinal member 16' of the holder 16. The portion 64 is provided with a preferably longitudinal central aperture 66 in which the longitudinal member 16' of the holder 16 is inserted.

A first adjustment member 58 allowing height adjustment of the capsule-removing mechanism 32 relative to the holder 16 is provided. This adjustment member 58 includes, for example, a screw that makes it possible to adjust the height H between the holder 16 and the capsule-removing mechanism 32. This height H is, for example, measured between the contact point 35 of the capsule-removing knives 34A and 34B and the median axis X-X'. Thus, a relative displacement of the capsule-removing mechanism 32 is possible in order to move the support 16 away or closer. It follows that the capsule-removing mechanism 32 may be adjusted in terms of height with the aid of the adjustment member 58 by sliding the portion 64 in the direction of the arrow $F_1$ (FIG. 2) relative to the longitudinal member 16' of the holder 16.

The disgorging apparatus 10 further includes a second adjustment member 60 allowing adjustment of the inclination of the capsule-removing mechanism 32 relative to the holder 16. In the case in point, the capsule-removing mechanism 32 is secured to the longitudinal member 16' of the holder 16 while being free to be able to pivot about the median axis X-X' in the direction of the arrow $F_2$ (FIG. 3). Since the adjustment member 60 and, in particular, the grip 62 that it includes does not exert any pressure on the portion 64, the capsule-removing mechanism 32 is able to have an angular clearance relative to the vertical. Thus, the inclination of the free end edges 38A and 38B can vary and the angles α1 and α2 may be adjusted relative to the vertical axis Y. The angles α1 and α2 may, in particular, have different values.

The disgorging apparatus 10 further includes a third adjustment member 68 allowing adjustment of the distance L of the capsule-removing mechanism 32 relative to the holder 16. To that end, the adjustment member 68 allows extension of the longitudinal member 16' of the holder 16 relative to the semi-circular ring 24. Thus, understandably, the capsule-removing mechanism 32 is able to be moved away from or closer to the semi-circular ring 24, along the median axis X-X' in the direction of the arrow $F_3$ (FIG. 2).

As described in greater detail below, these three adjustment members 58, 60 and 68 enable the disgorging apparatus to be adapted to different bottle formats.

In these sparkling-wine disgorging operations, it is essential for the wine contained in the bottle 18 not to be in contact with the air for too long a period, in order to prevent any oxidation of the wine. Therefore, it is necessary to close the neck of the bottle 18 as soon as possible after capsule removal.

To that end, the disgorging apparatus 10 further includes a stopper-forming member 70 designed to close the neck 18B of the bottle 18 at least provisionally after removal of the capsule 36. This stopper-forming member 70 is mounted pivotably on the tilting mechanism such that it can adopt an open position, as illustrated in FIG. 1 or 2, in which it does not close the bottle 18, and a closed position, as illustrated in FIG. 5, in which it closes the bottle 18.

This stopper-forming member 70 is synchronized with the pivoting of the tilting mechanism 14. In a manner known per se, the displacement of the member forming the stopper 70, in the case in point the pivoting thereof, is controlled pneumatically, being actuated by a pneumatic sensor described in greater detail below.

The tilting mechanism 14 is controlled by pneumatic means 71 of known type and are thus not described. The disgorging apparatus 10 further comprises a system for synchronizing capsule removal as a function of the position of the neck 18B of the bottle 18 relative to the horizontal. In the case in point, the disgorging apparatus 10 includes a roller 72 mounted rotatably on a horizontal shaft 74 that is secured to the frame 12 in an adjustable manner. The tilting mechanism 14, for its part, includes a cam portion 76 designed to come into contact with the roller 72 in order to pivot the capsule-removing mechanism 32 and thus to allow automatic removal of the capsule 36 while the bottle 18 is tilted upward.

In the low position of the tilting mechanism 14, as illustrated in FIG. 1, the cam portion 76 is not yet in contact with the roller 72. When the tilting mechanism 14 begins to tilt upward, the cam portion 76 comes into contact with the roller 72 via the free end portion 76A thereof, then slides against the roller 72, thus giving rise to the pivoting of the capsule-removing mechanism 32 relative to the holder 16.

In a predetermined angular position, as illustrated in FIG. 6, the capsule-removing knives 34A and 34B move the capsule 36 away from the neck 18C of the bottle 18. Then, through the effect of the release of pressurized gas formed in the bottle, the capsule 36 and also the sediment formed by excess fermentation of wine are ejected outside the bottle. Generally, a little wine is likewise ejected during disgorging.

A device (not illustrated) for recovering the capsule 36, the sediment and the ejected wine may be provided for reasons of operator safety and to catch the capsule 36, the sediment and the wine ejected.

A description will now be given of the steps in the disgorging method.

Starting from the low position of the tilting mechanism 14, which is illustrated in FIG. 1, the operator positions a bottle 18 with its neck 18A inclined downward and covered by a capsule 36, first accommodating the shoulder 18A on the semi-circular ring 24 and, second, sliding the domed part forming a stop 20 until it interacts with the punt 22 formed in the base of the bottle 18.

While the operator is positioning the bottle 18 on the holder 16, the knives 34A and 34B are raised in order to allow the capsule 36 to pass, and then they descend again under their own weight, moving closer to the median axis X-X'.

The operator then checks that the knives 34A and 34B are properly positioned between the ring 44 of the bottle 18 and the free edge of the indentations 40 of the capsule 36. If not, and particularly when the axis XX-XX' of the bottle is offset relative to the median axis X-X', the operator may act, on the one hand, on the compensation members of the stirrup-shaped piece 46 and, on the other, on the above-mentioned three adjustment members 58, 60 and 68 of the capsule-removing mechanism 32.

The operator can thus act on the position of the knives 34A and 34B by adjusting the position of the stop 33. It is preferable for said stop to be just in contact with the bottle neck. If not, the operator acts on the stop 33 to move it away from or closer to the stirrup-shaped piece 46.

The operator can, furthermore, act on the position of the capsule-removing mechanism 32, in three directions (height, spacing, inclination) relative to the holder 16, by making one and/or another of the following adjustments:

adjustment of the height of the capsule-removing mechanism 32 so that one at least of the free end portions 42A and 42B of the knives 34A and 34B comes into contact at the rear of at least one indentation 40 of the capsule 36, adjustment of the inclination of the capsule-removing mechanism 32 by pivoting the stirrup-shaped piece 46 relative to the median axis X-X', so that one at least of the free end edges 38A and 38B of the knives 34A and 34B comes into contact at the rear of at least one indentation 40 of the capsule 36, adjustment of the spacing of the capsule-removing mechanism 32 relative to the ring 24 of the bottle, so that the free end portions 42A and 42B are positioned between the ring 44 of the bottle and the rear of the indentations 40 of the capsule 36.

These adjustments make it possible to adapt the disgorging apparatus to all types of formats of bottles 18 and also to offset geometric variations that may arise in bottles of the same format. Indeed, from one format to another, but also for one and the same format, bottles do not always have the same length of neck 18C nor the same neck diameter; similarly, the lip may be slightly inclined relative to the longitudinal axis XX-XX' of the bottle, such that the capsule 36 is not actually perpendicular to said axis XX-XX'.

These variations in geometry from one bottle to another give rise, in the case of known apparatus for the removal of sediment in which the capsule-removing disgorging mechanism is not adjustable, to a risk of fracture of the neck or failure of the disgorging operation. In order to offset these drawbacks, the disgorging apparatus according to the invention makes it possible, by means of the various above-mentioned adjustments of height, inclination and/or spacing of the capsule-removing mechanism 32, to compensate for the discrepancy between the longitudinal axis XX-XX' of the bottle and the median axis X-X' of the holder 16.

When the operator has performed these adjustments, the disgorging apparatus is ready for easy semi-automatic use, including in the case of an operator unfamiliar with disgorging in general and, most particularly, with the disgorging of large-capacity bottles over and above the jeroboam.

These adjustment operations are not necessarily performed at each bottle change. In general, bottles of the same format, of the same series and originating from the same glassmaker have the same geometric characteristics. Therefore, the operator preferably performs these operations during positioning of the first bottle in the series and then simply ensures that the capsule-removing knives are properly positioned for each bottle. Conversely, understandably, these adjustments must preferably be made as soon as the operator observes a shift and, naturally, as soon as he changes a bottle series and/or a bottle format.

The precise moment of disgorging may, furthermore, be adjusted with the aid of a member 78 for adjusting the height of the roller 72 and a longitudinal adjustment member 80, which make it possible to adjust the spacing of the cam 72 relative to the holder 16.

After positioning of the bottle and any adjustment(s), the cover 30 is tilted in order to protect the operator. The operator then tilts the tilting mechanism 14 with the aid of pneumatic means 71 controlled by control means 82 of known type illustrated in FIG. 1 and not described in detail herein.

At a predetermined angular position, such as illustrated, for example, in FIG. 6, in which the neck 18C of the bottle is already located above the horizontal, the free end 76A of the cam portion 76 begins to interact with the roller 72. Upward pivoting of the tilting mechanism 14 continues and then the capsule-removing mechanism 32 begins to pivot because the cam 76 is in contact with the roller 72. The capsule 36 begins to be removed and the pressurized gas to be ejected, entraining the sediment with it outside of the bottle.

As soon as the cam 76 reaches the end of its travel, as illustrated in FIG. 5, the stopper-forming member 70 is actuated automatically and closes the neck 18C of the bottle 18. To that end, an end-of-position sensor of the cam, located at the level of the tilting mechanism 14, allows actuation of the pneumatic means, in the present case a ram 73 connected to the stopper-forming member 70, and allows the latter to pivot.

The disgorging operation is thus complete. The operator opens the cover 30 and the stopper-forming member 70 and is able to remove the bottle 18.

The invention claimed is:

1. An apparatus for the removal of sediment from sparkling wines, designed to remove the capsule covering the neck of a bottle containing sparkling wine, comprising:
   a frame having a top and a bottom,
   a tilting mechanism comprising:
      a holder for supporting a bottle in a predetermined position in which said bottle extends between a neck and a base longitudinally along a longitudinal axis XX-XX' close to a median axis X-X' which is fixed with respect to said holder, said holder being movable on the frame between a low position, in which the neck of the bottle is inclined downward below the horizontal relative to the base of the bottle the neck being oriented toward the bottom of the frame, and a high position, in which the neck of the bottle is inclined upward, the neck being oriented toward the top of the frame, and
      a capsule-removing mechanism provided with at least one capsule-removing knife, said capsule-removing mechanism being movable on the holder and synchronized with said holder so that said at least one capsule-removing knife removes the capsule when the holder is in a predetermined angular position relative to the horizontal, characterized in that said at least one capsule-removing knife is movable relative to the capsule-removing mechanism in order to approach and to move away from said median axis X-X', said capsule-removing knife being urged toward said median axis X-X'.

2. The apparatus for the removal of sediment according to claim 1, wherein said at least one capsule-removing knife slides under its own weight in the capsule-removing mechanism.

3. The apparatus for the removal of sediment according to claim 1, wherein the capsule-removing knife has a free end edge that is inclined relative to the horizontal and a beveled end portion.

4. The apparatus for the removal of sediment according to claim 1, wherein the capsule-removing device comprises two capsule-removing knives.

5. The apparatus for the removal of sediment according to claim 4, wherein the capsule-removing knife has a free end edge that is inclined relative to the horizontal and a beveled end portion, and wherein the inclination of the free end of one of the two capsule-removing knives opposes the inclination of the free end edge of the other of the two capsule-removing knives.

6. The apparatus for the removal of sediment according to claim 1, wherein the holder slides relative to the tilting mechanism along the longitudinal axis XX'.

7. The apparatus for the removal of sediment according to claim 1, further comprising a roller mounted rotatably about a shaft fixed to the frame in an adjustable manner, the tilting mechanism further comprising a cam portion designed to come into contact with said roller in order to pivot the capsule-removing mechanism and thus remove the capsule.

8. The apparatus for the removal of sediment according to claim 1, wherein the capsule-removing mechanism includes a movable part on which is fixed said at least one capsule-removing knife and compensation members allowing optimization of the position of said at least one capsule-removing knife relative to the neck.

9. The apparatus for the removal of sediment according to claim 8, further comprising members for adjusting the shaft of the roller that make it possible to adjust the synchronicity of the capsule-removing mechanism.

10. The apparatus for the removal of sediment according to claim 1, further comprising adjustment members that allow the adjustment of the capsule-removing mechanism relative to the holder, in terms of height, in terms of inclination and/or in terms of spacing.

11. The apparatus for the removal of sediment according to claim 1, further comprising a stopper-forming member designed to provisionally close the neck of the bottle after removal of the capsule, said stopper-forming member being movable between an open position, in which it is distanced from the bottle, and a closed position, in which it closes the neck of the bottle.

12. A method for the removal of sediment from sparkling wines designed to remove a capsule covering a neck of a bottle containing sparkling wine, said method comprising the following steps:
   positioning the bottle on the holder of an apparatus for the removal of sediment as claimed in claim 1, when said holder is in the low position,
   automatic positioning of said at least one capsule-removing knife relative to the bottle, automatic tilting of the bottle toward the high position and automatic removal of the capsule from the bottle during said tilting, with simultaneous ejection of the sediment contained in the neck of the bottle.

13. The method for the removal of sediment according to claim 12, wherein the automatic positioning of said at least one capsule-removing knife is achieved by means of raising then automatic release of the capsule-removing knife between the free edge of the indentations of the capsule and the ring of the bottle during positioning of the bottle.

14. The method for the removal of sediment according to claim 12, wherein, after removal of the capsule, the bottle is automatically closed.

15. The method for the removal of sediment according to claim 12, wherein the holder slides toward said at least one capsule-removing knife prior to the automatic tilting of the bottle toward the high position.

16. The apparatus for the removal of sediment according to claim 2, wherein the capsule-removing knife has a free end edge that is inclined relative to the horizontal and a beveled end portion.

17. The apparatus for the removal of sediment according to claim 7, wherein the capsule-removing mechanism includes a movable part on which is fixed said at least one capsule-removing knife and compensation members allowing optimization of the position of said at least one capsule-removing knife relative to the neck.

18. The apparatus for the removal of sediment according to claim 7, further comprising adjustment members that allow the adjustment of the capsule-removing mechanism relative to the holder, in terms of height, in terms of inclination and/or in terms of spacing.

19. The method for the removal of sediment according to claim 13, wherein, after removal of the capsule, the bottle is automatically closed.

20. The method for the removal of sediment according to claim 14, wherein the holder slides toward said at least one capsule-removing knife prior to the automatic tilting of the bottle toward the high position.

* * * * *